Patented Oct. 11, 1927.

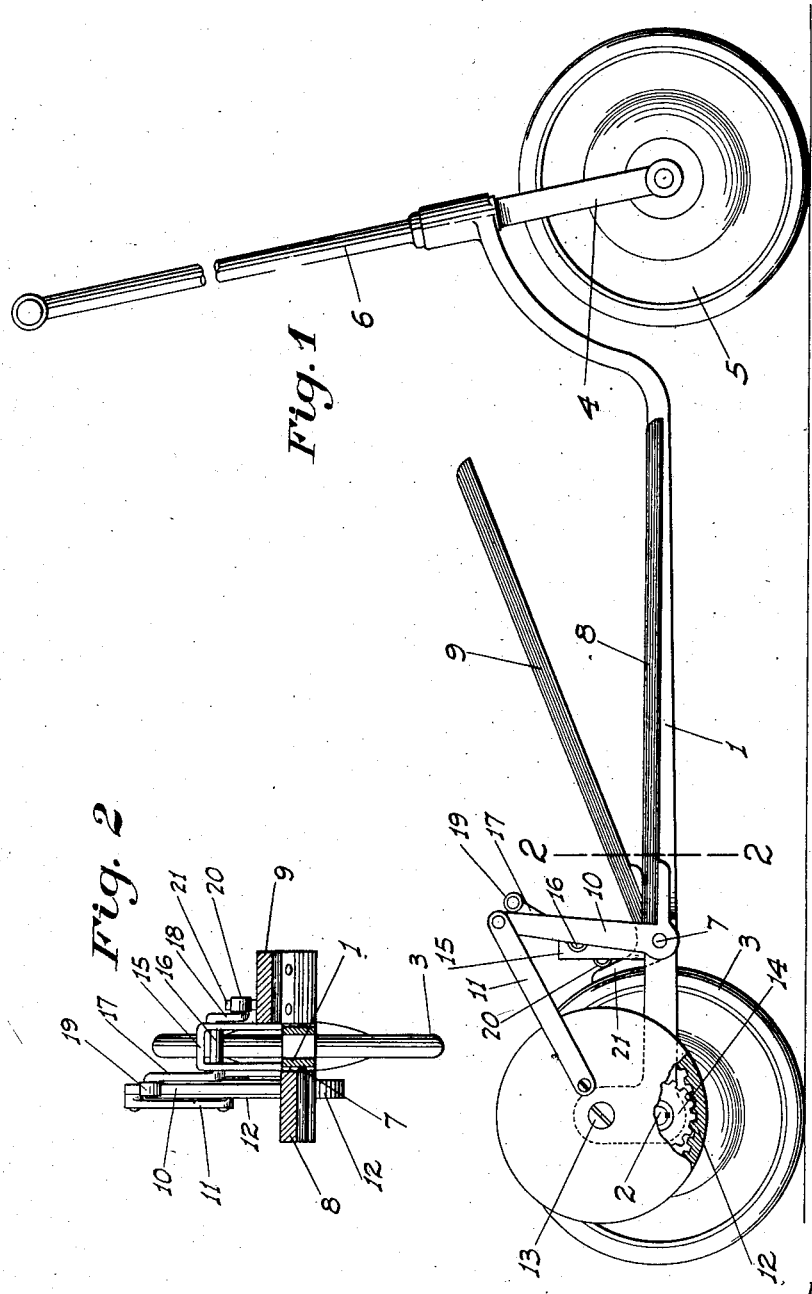

1,644,836

UNITED STATES PATENT OFFICE.

THOMAS A. JACKSON, OF PITTSBURG, CALIFORNIA.

PEDAL-PROPELLED SCOOTER.

Application filed September 2, 1926. Serial No. 133,128.

This invention relates to improvements in that type of child's velocipede known as a scooter, and particularly to the form of such vehicle which is provided with transversely spaced movable pedals to bear the weight of the rider and whose movement causes the rear wheel of the vehicle to be driven.

The principal object of my invention is to interconnect the pedals (which merely oscillate through a limited arc rather than revolve through a complete revolution) in such a manner that a downward pressure on one pedal will cause a positive upward movement to be imparted to the other pedal. This enables the use of a single crank driving connection between only one of said pedals and the wheel, avoids the necessity of having to depend on the momentum of the vehicle to raise said pedal and largely eliminates any deadcenter position of the pedal being had.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawings similar characters of reference indicate corresponding parts in the several views:

Fig. 1 is a side elevation of my improved scooter.

Fig. 2 is a cross section on the line 2—2 of Fig. 1.

Referring now more particularly to the characters of reference on the drawings, the numeral 1 denotes a longitudinal frame structure of suitable character which at its rear end supports the axle 2 of the rear wheel 3, and at its front end is arranged as a bearing for the swivel fork 4 which supports the spindle of the front wheel 5. The fork is provided with the usual vertical steering handle 6 extending a suitable distance above the frame so that front wheel may be steered at the option of the rider.

Mounted in the frame just ahead of the rear wheel is a transverse pin 7, on which on each side of the frame are turnably mounted pedals or pads 8 and 9 of suitable length which extend forwardly from the pin alongside the frame.

Projecting upwardly from the rear end of the pedal 8 and rigidly connected thereto is an arm 10. From the upper end of this arm a link or connecting rod 11 extends to an eccentric or crank connection with an internal gear 12 which is disposed alongside the rear wheel 3. The axle pin 13 of this gear is fixed in the frame 1 above the rear wheel axle 2, the gear preferably turning on the pin. A pinion 14 fixed on the axle 2 meshes with the gear. It will therefore be seen that as the pedal 8 oscillates through a certain arc the gear will be rotated and the wheel driven.

In order to connect the pedals together so that they will oscillate simultaneously and in opposed relation, and so that one pedal will be raised by the downward movement of the other, without depending upon the momentum of the vehicle and the rotation of the gear, and without necessitating the use of a separate gear for the pedal 9, I provide the following structure.

Mounted on and projecting upwardly from the frame between the pedals and adjacent the rear end thereof is a fixed bracket 15. A transverse shaft 16 journaled in this bracket has oppositely extending crank arms 17 and 18 at its ends. The arm 17 projects upwardly and carries a roller 19 on its free end which bears against the forward face of the arm 10. The arm 18 extends downwardly and carries a roller 20 which bears against the forward face of an arm 21 which projects upwardly from the pedal 9 adjacent its rear end. It will therefore be seen that as the pedal 8 is depressed, the arm 10 moves forwardly, pressing on the roller 19 to move the arm 17 forwardly and the opposed arm 18 rearwardly. The movement of the latter presses the arm 21 rearwardly, causing the pedal 9 to be raised. The oscillating movement of the pedals in either direction is of course limited by the stroke of the link 11 as will be evident.

The length of the corresponding arms and the distance of the points of engagement of the respective rollers with the arms, from the axle pin 7, is such that the arcuate movement of the arms and consequently of the pedals will be equal and will take place in oppositely timed relation at all times.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention what I claim as new and useful and desire to secure by Letters Patent is:

1. A velocipede comprising a frame, front and rear wheels supporting the frame, longitudinally extending pedals disposed to the sides of the frame and pivoted thereon for independent movement, a driving mechanism between one only of said pedals and the rear wheel to cause the latter to be driven with the depression of said pedal, and means between the pedals to cause both pedals to oscillate in oppositely timed relation and to cause the wheel to be also driven with the depression of said other pedal.

2. A velocipede comprising a frame, front and rear wheels supporting the frame, longitudinally extending pedals disposed to the sides of the frame and pivoted thereon for independent movement, a driving mechanism between one of said pedals and the rear wheel to cause the latter to be driven with the depression of said pedal, arms projecting from the pedals adjacent their pivotal connection with the frame, and a crank structure having opposed crank arms turnably supported from the frame, the crank arms at their ends bearing against those faces of the pedal arms which will cause the depression of one pedal to impart a positive upward movement to the other pedal.

3. A velocipede comprising a frame, front and rear wheels supporting the frame, longitudinally extending pedals disposed to the sides of the frame and pivoted thereon for independent movement, a driving mechanism between one of said pedals and the rear wheel to cause the latter to be driven with the depression of said pedal, arms projecting upwardly from the pedals adjacent their pivoted connection with the frame and a crank structure having opposed crank arms turnably supported from the frame above said pivotal connection, the crank arms at their ends bearing against the forward faces of the pedal arms, whereby as one pedal is depressed the other will be positively raised, and vice versa.

In testimony whereof I affix my signature.

THOMAS A. JACKSON.